US012072726B2

(12) United States Patent
Wang et al.

(10) Patent No.: US 12,072,726 B2
(45) Date of Patent: *Aug. 27, 2024

(54) VOLTAGE REFERENCE CIRCUIT AND METHOD FOR PROVIDING REFERENCE VOLTAGE

(71) Applicant: Taiwan Semiconductor Manufacturing Company, Ltd., Hsinchu (TW)

(72) Inventors: Yen-Ting Wang, Round Rock, TX (US); Alan Roth, Leander, TX (US); Eric Soenen, Austin, TX (US); Alexander Kalnitsky, San Francisco, CA (US); Liang-Tai Kuo, Zhudong Township, Hsinchu County (TW); Hsin-Li Cheng, Hsin Chu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,887

(22) Filed: Apr. 28, 2023

(65) Prior Publication Data

US 2023/0266785 A1 Aug. 24, 2023

Related U.S. Application Data

(63) Continuation of application No. 17/143,369, filed on Jan. 7, 2021, now Pat. No. 11,675,383.

(Continued)

(51) Int. Cl.
*G05F 3/26* (2006.01)
*G05F 3/24* (2006.01)

(52) U.S. Cl.
CPC ................ *G05F 3/262* (2013.01); *G05F 3/24* (2013.01); *G05F 3/247* (2013.01)

(58) Field of Classification Search
CPC . G05F 3/262; G05F 3/24; G05F 3/242; G05F 3/247

(Continued)

(56) References Cited

U.S. PATENT DOCUMENTS 5,666,046 A * 9/1997 Mietus .................... G05F 3/267 323/907
10,345,846 B1 * 7/2019 Bartling .................. G05F 3/247

(Continued)

*Primary Examiner* — Yemane Mehari
(74) *Attorney, Agent, or Firm* — McClure, Qualey & Rodack, LLP

(57) ABSTRACT

Voltage reference circuits are provided. A voltage reference circuit includes a first transistor, a flipped-gate transistor, a first current mirror unit, a second current mirror unit, and an output note. The first transistor is formed by a plurality of second transistors. A gate and a drain of the flipped-gate transistor are coupled to a gate and a drain of each second transistor. The first current mirror unit is configured to provide a first current to the flipped-gate transistor and a mirroring current in response to a bias current. The second current mirror unit is configured to drain a second current from the first transistor in response to the mirroring current. The output node is coupled to a source of each second transistor and the second current mirror unit, and configured to output a reference voltage. Size of the flipped-gate transistor is less than that of the first transistor.

20 Claims, 7 Drawing Sheets

Related U.S. Application Data

(60) Provisional application No. 62/977,437, filed on Feb. 17, 2020.

(58) Field of Classification Search
USPC .......................................................... 323/313
See application file for complete search history.

(56) References Cited

U.S. PATENT DOCUMENTS

| | | | | |
|---|---|---|---|---|
| 2015/0234412 | A1 | 8/2015 | Al-Shyoukh et al. | |
| 2015/0234413 | A1* | 8/2015 | Al-Shyoukh ............. | G05F 3/24<br>323/313 |
| 2016/0094124 | A1 | 3/2016 | Al-Shyoukh et al. | |

* cited by examiner

VOLTAGE REFERENCE CIRCUIT AND METHOD FOR PROVIDING REFERENCE VOLTAGE

CROSS REFERENCE TO RELATED APPLICATIONS

This Application is a Continuation of application Ser. No. 17/143,369, filed on Jan. 7, 2021, now U.S. Pat. No. 11,675,383, which claims the benefit of U.S. Provisional Application No. 62/977,437, filed on Feb. 17, 2020, the entirety of which are incorporated by reference herein.

BACKGROUND

A voltage reference circuit is used to provide a reference voltage signal to one or more circuits. The circuit uses the reference voltage as a means of comparison during operation. For example, in voltage regulator applications, a feedback signal is compared against the reference voltage in order to create a regulated output voltage that corresponds to a scaled value of the reference voltage.

In some approaches, the voltage reference circuit is formed by using bipolar junction transistors (BJTs) to form bandgap references to provide the reference voltage. In PNP BJTs, the substrate acts as a collector for the BJT thereby rendering the BJT sensitive to majority carrier noise in the substrate. In NPN BJTs, the collector is formed as an N-well in a P-type substrate and is susceptible to picking up minority carrier noise from the substrate. Neither NPN BJTs nor PNP BJTs allow full isolation from substrate noise.

In some approaches, complementary metal oxide semiconductor (CMOS) devices are used to form the voltage reference circuit. In some instances, the CMOS devices are fabricated in a triple well flow such that every CMOS device is reverse-junction-isolated from the main substrate. In some approaches, a CMOS device includes a polysilicon gate feature which is doped using the opposite dopant type from the dopant in the substrate for the CMOS device.

BRIEF DESCRIPTION OF THE DRAWINGS

Aspects of the present disclosure are best understood from the following detailed description when read with the accompanying figures. It should be noted that, in accordance with the standard practice in the industry, various nodes are not drawn to scale. In fact, the dimensions of the various nodes may be arbitrarily increased or reduced for clarity of discussion.

DETAILED DESCRIPTION

Figure 1:
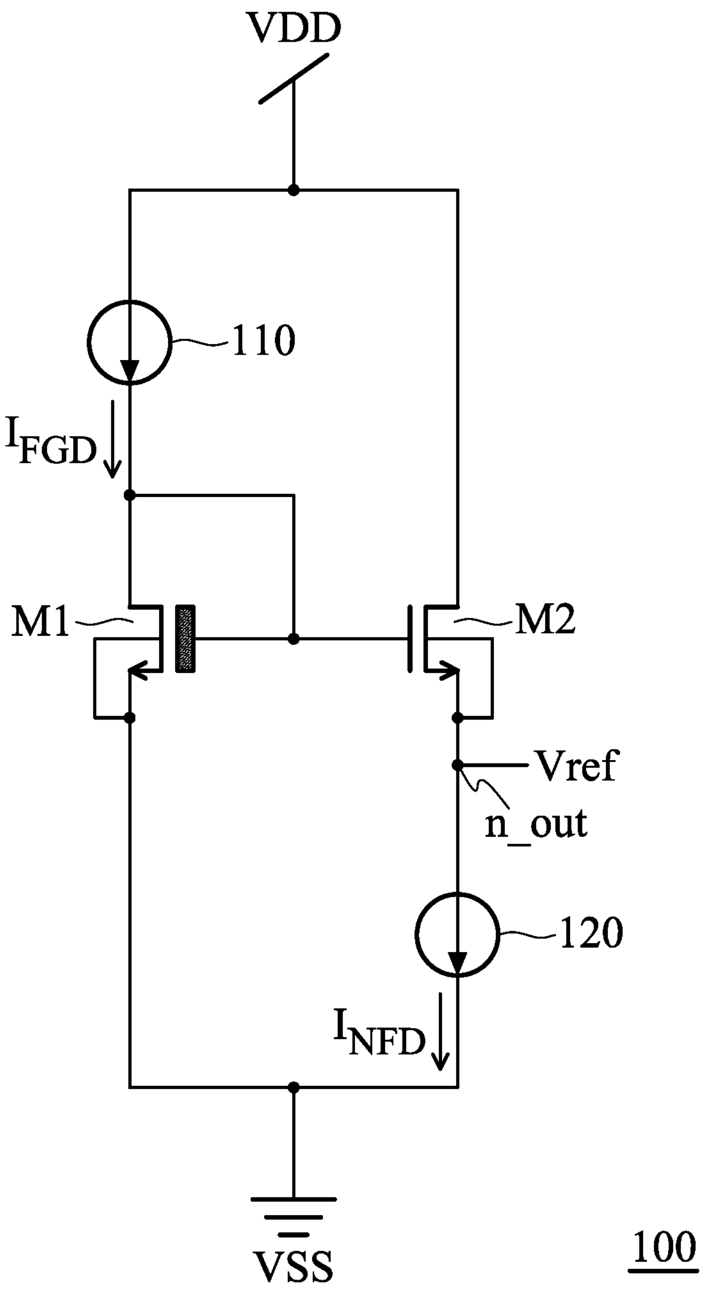
FIG. 1 shows a voltage reference circuit, in accordance with some embodiments of the disclosure.

The following disclosure provides many different embodiments, or examples, for implementing different nodes of the subject matter provided. Specific examples of components and arrangements are described below to simplify the present disclosure. These are, of course, merely examples and are not intended to be limiting. In some embodiments, the formation of a first node over or on a second node in the description that follows may include embodiments in which the first and the second nodes are formed in direct contact, and may also include embodiments in which additional nodes may be formed between the first and the second nodes, such that the first and the second nodes may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

Furthermore, spatially relative terms, such as “beneath,” “below,” “lower,” “above,” “upper” and the like, may be used herein for ease of description to describe one element or feature’s relationship to another element or feature as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 shows a voltage reference circuit 100, in accordance with some embodiments of the disclosure. The voltage reference circuit 100 includes a current source 110, a current source 120, a flipped-gate transistor M1 and a transistor M2. The flipped-gate transistor M1 is coupled between the current source 110 and a ground VSS (or a negative supply voltage). The current source 110 is coupled between a power VDD (or a positive supply voltage) and the flipped-gate transistor M1.

The current source 110 is configured to provide or supply a current $I_{FGD}$ across the flipped-gate transistor M1. In some embodiments, the current source 110 includes at least one current mirror. In some embodiments, the current source 110 includes a startup device and a current generation device, or another suitable current source.

The transistor M2 is coupled between the power VDD and the current source 120. The transistor M2 is coupled to the flipped-gate transistor M1 in a Vgs subtractive arrangement. The Vgs subtractive arrangement results from a gate of the transistor M2 and a gate of the flipped-gate transistor M1 receiving the same voltage and a source of the flipped-gate transistor M1 coupled to the ground VSS. The transistor M2 is used to produce the temperature independent reference voltage Vref. The transistor M2 is a non-flipped-gate transistor. In some embodiments, the transistor M2 is a standard NMOS transistor. The gate of transistor M2 is coupled to the gate of flipped-gate transistor M1.

The current source 120 is coupled between the transistor M2 and the ground VSS. The current source 120 is configured to drain a current $I_{NFD}$ form the transistor M2. In some embodiments, the current source 120 includes at least one current mirror. In some embodiments, the current source 120 includes a startup device and a current generation device, or another suitable current source.

An output node n_out is configured to output a reference voltage Vref and is coupled between the source of the transistor M2 and the ground VSS. In the voltage reference circuit 100, the source and the bulk of the flipped-gate transistor M1 are coupled together, and the source and the bulk of the transistor M2 are coupled together.

The flipped-gate transistor M1 is used to produce a temperature independent reference voltage Vref. The flipped-gate transistor M1 includes a gate electrode which is anti-doped. Anti-doping is a process of doping the gate electrode with a dopant type which is the same as a substrate of flipped-gate transistor M1. For example, in a conventional N-type metal oxide semiconductor (NMOS), the substrate is P-doped and the gate electrode is N-doped. However, in a flipped-gate NMOS, a portion of the gate electrode is P-doped.

Figure 2:
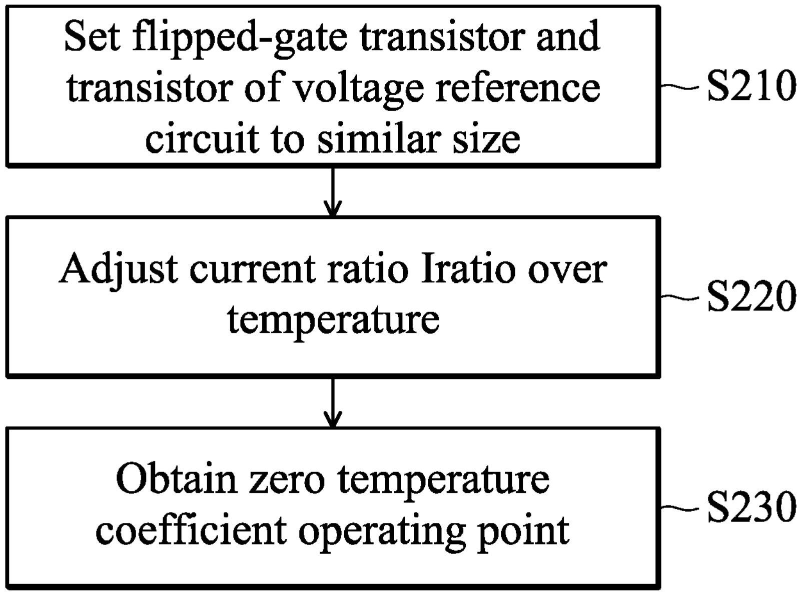
FIG. 2 shows a method for obtaining a zero-temperature coefficient (ZTC) operating point for the reference voltage Vref in the voltage reference circuit of FIG. 1, in accordance with some embodiments of the disclosure.

FIG. 2 shows a method for obtaining a zero-temperature coefficient (ZTC) operating point for the reference voltage Vref in the voltage reference circuit 100 of FIG. 1, in accordance with some embodiments of the disclosure.

In operation S210, the flipped-gate transistor M1 and the transistor M2 of the voltage reference circuit 100 of FIG. 1 are set to similar sizes. For example, the flipped-gate transistor M1 has a width W1 and a length L1, and the width W1 and the length L1 define the area size of the channel in the flipped-gate transistor M1. The transistor M2 has a width W2 and a length L2, and the width W2 and the length L2 define the area size of the channel in the transistor M2. The ratio of width W1 to length L1 of the flipped-gate transistor M1 is set so that it equals the ratio of width W2 to length L2 of the transistor M2, i.e., W1/L1=W2/L2. In some embodiments, the flipped-gate transistor M1 and the transistor M2 are the same size.

In operation S220, a current ratio Iratio of the current $I_{FGD}$ flowing through the flipped-gate transistor M1 to the current $I_{NFD}$ flowing through the transistor M2 (i.e., Iratio=$I_{FGD}$/$I_{NFD}$) in the voltage reference circuit 100, is adjusted or swept at each or some temperatures among a temperature range. The reference voltage Vref corresponding to the adjusted current ratio Iratio is measured.

In operation S230, a zero-temperature coefficient operating point is obtained according to the reference voltages Vref corresponding to various temperatures. In the zero temperature coefficient point, the current ratio Iratio is equal to a specific value, e.g., R. When the current ratio Iratio is equal to R, the reference voltages Vref at different temperatures have the same voltage value. The zero temperature coefficient point will be described below.

Figure 3:
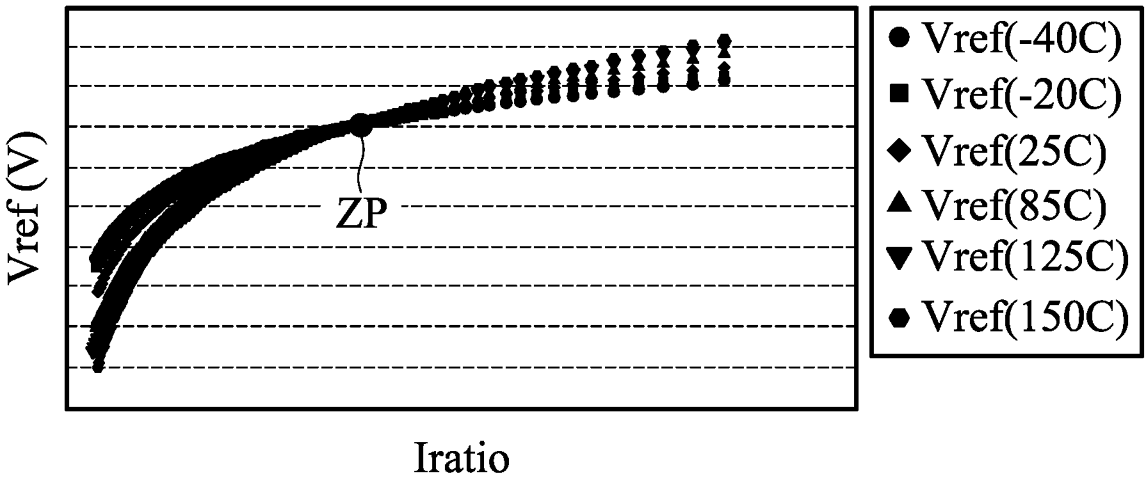
FIG. 3 shows the relationship between the current ratio Iratio and the reference voltage Vref at various temperatures, in accordance with some embodiments of the disclosure.

FIG. 3 shows the relationship between the current ratio Iratio and the reference voltage Vref at various temperatures, in accordance with some embodiments of the disclosure. In FIG. 3, the reference voltage Vref correspond to various current ratios Iratio at temperatures of −40° C., −20° C., 25° C., 85° C., 125° C. and 150° C. The curves corresponding to the reference voltage Vref at different temperatures intersect at a point ZP where the current ratio Iratio is R. The point ZP is a zero temperature coefficient (ZTC) point, and the reference voltage Vref corresponding to the current ratio Iratio of R is a temperature insensitive voltage. It should be noted that the ZTC operating point is single.

In FIG. 3, when the current ratio Iratio is equal to R, i.e., Iratio=R, the reference voltage Vref has zero temperature coefficient, and the reference voltage Vref is not affected by temperature. Furthermore, when the current ratio Iratio is greater than R, i.e., Iratio>R, the reference voltage Vref has a positive temperature coefficient (PTC), and the reference voltage Vref rises with temperature. Conversely, when the current ratio Iratio is less than R, i.e., Iratio<R, the reference voltage Vref has a negative temperature coefficient (NTC), and the reference voltage Vref decreases with temperature.

Figure 4:
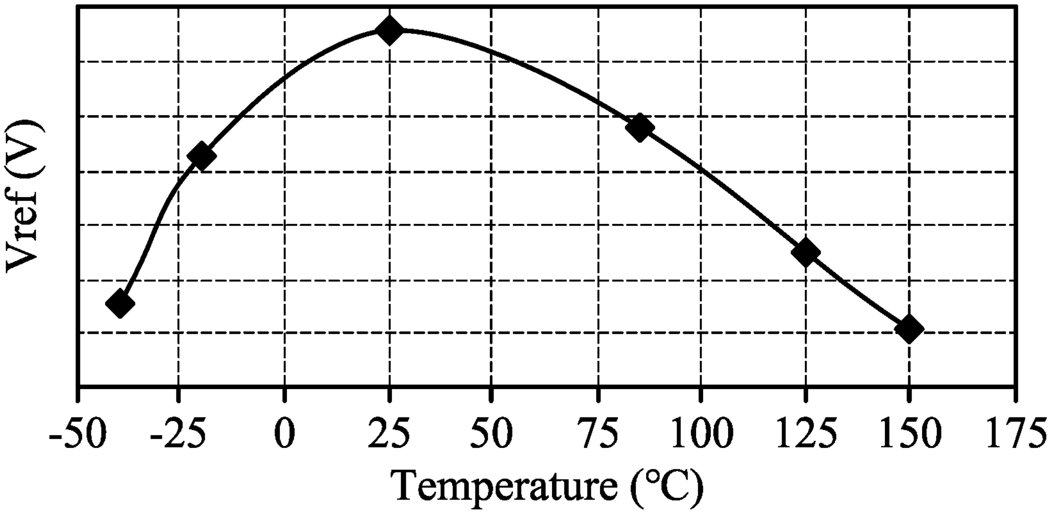
FIG. 4 shows the relationship between the temperature and the reference voltage Vref when the current ratio Iratio is equal to R, in accordance with some embodiments of the disclosure.

FIG. 4 shows the relationship between the temperature and the reference voltage Vref when the current ratio Iratio is equal to R, in accordance with some embodiments of the disclosure. In the embodiment, the maximum reference voltage Vref_max is at 25° C., and the minimum reference voltage Vref_min is at 150° C. The voltage difference of the reference voltage Vref over the whole temperature range is equal to the voltage difference between the maximum reference voltage Vref_max and the minimum reference voltage Vref_min. Furthermore, the minimal voltage difference of the reference voltage Vref over the whole temperature range is obtained when the current ratio Iratio is R.

Figure 5:
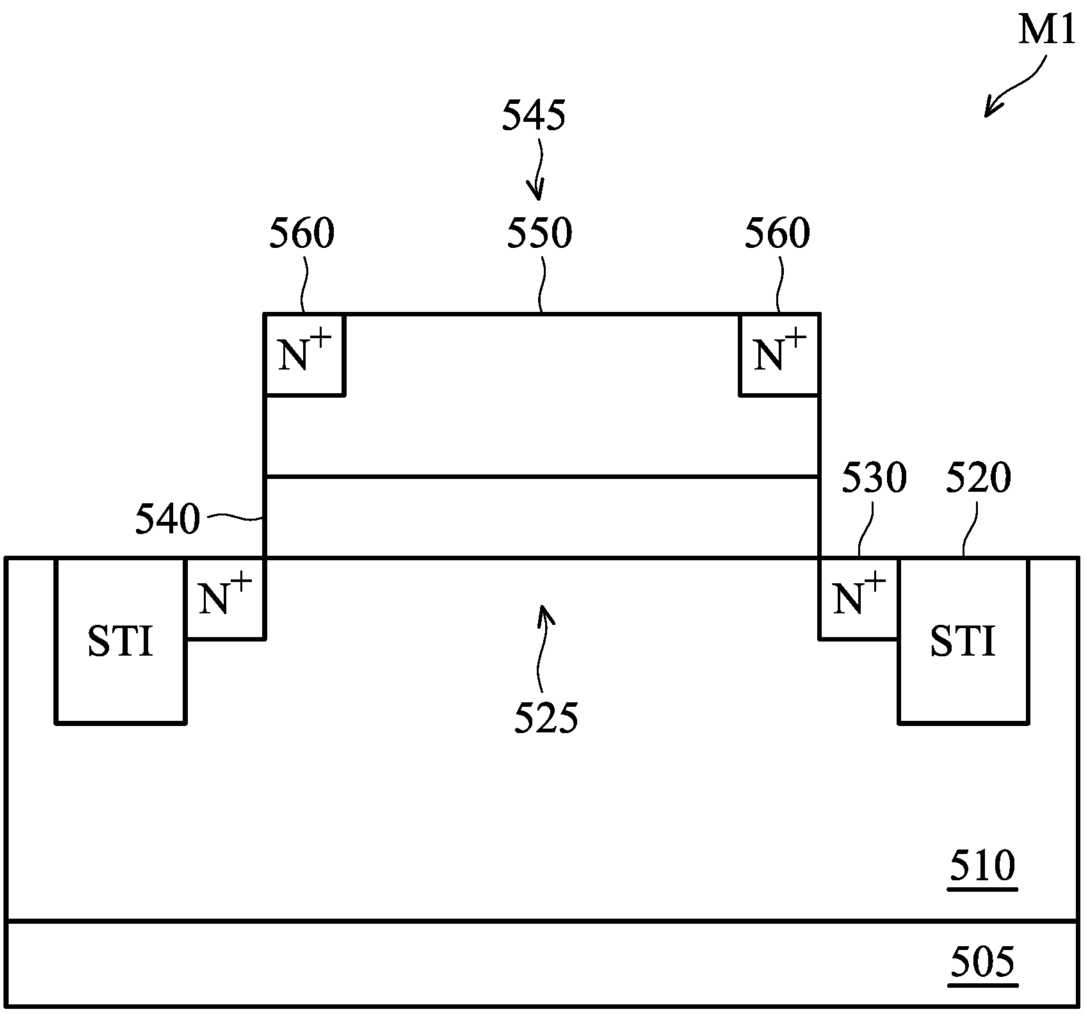
FIG. 5 is a cross sectional view of the flipped-gate transistor of FIG. 1, in accordance with some embodiments of the disclosure.

FIG. 5 is a cross sectional view of the flipped-gate transistor M1 of FIG. 1, in accordance with some embodiments of the disclosure. The flipped-gate transistor M1 is an N-type flipped-gate transistor. The flipped-gate transistor M1 includes a substrate 505. In some embodiments, the substrate 505 is a Si substrate. In some embodiments, the material of the substrate 505 is selected from a group consisting of bulk-Si, SiP, SiGe, SiC, SiPC, Ge, SOI—Si, SOI—SiGe, III-VI material, and combinations thereof.

A P-type well region 510 is formed over the substrate 505. A gate dielectric layer 540 is formed over a channel region 525 of the flipped-gate transistor M1. A gate electrode 545 is formed over the gate dielectric layer 540. The body region 550 of the gate electrode 545 is doped with P-type dopants. In some embodiments, the body region 550 is formed by P-type poly. Edges 560 of the gate electrode 545 are N-doped for self-aligned formation of N-doped source/drain (S/D) regions 530. Isolation regions 520 are formed between the adjacent flipped-gate transistors. In some embodiments, the isolation regions 520 are shallow trench isolation (STI). In some embodiments, the gate electrode 545 includes doped polysilicon, a metal gate or another suitable gate material. In some embodiments, the P-type dopants include boron, boron di-fluoride, or other suitable p-type dopants. In some embodiments, the N-type dopants include arsenic, phosphorous, or other suitable N-type dopants.

Figure 6:
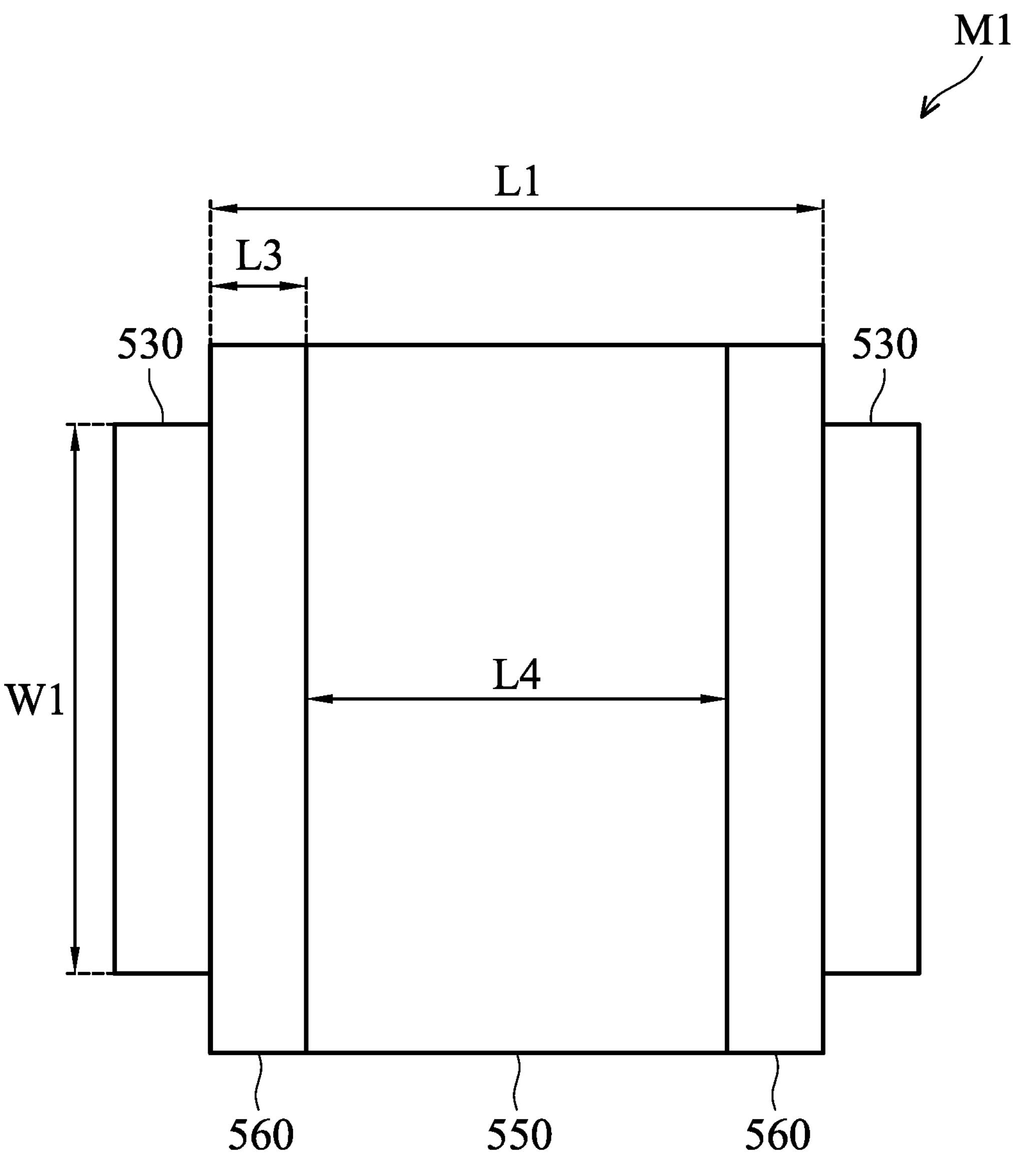
FIG. 6 is a top view of the flipped-gate transistor of FIG. 1, in accordance with some embodiments of the disclosure.

FIG. 6 is a top view of the flipped-gate transistor M1 of FIG. 1, in accordance with some embodiments of the disclosure. As described above, the flipped-gate transistor M1 has the width W1 and the length L1, and the width W1 and the length L1 define the area size of the channel in the flipped-gate transistor M1. In some embodiments, the width W1 and the length L1 are in a range from about 5 um to about 10 um. In some embodiments, the length L3 of the edges 560 of the gate electrode 545 is in a range from about 0.1 um to about 0.3 um. Moreover, the length L4 of the body region 550 of the gate electrode 545 is equal to the length L1 of the flipped-gate transistor M1 minus twice the length L3 of the edges 560 of the gate electrode 545. i.e., L4=L1−2*L3.

Figure 7:
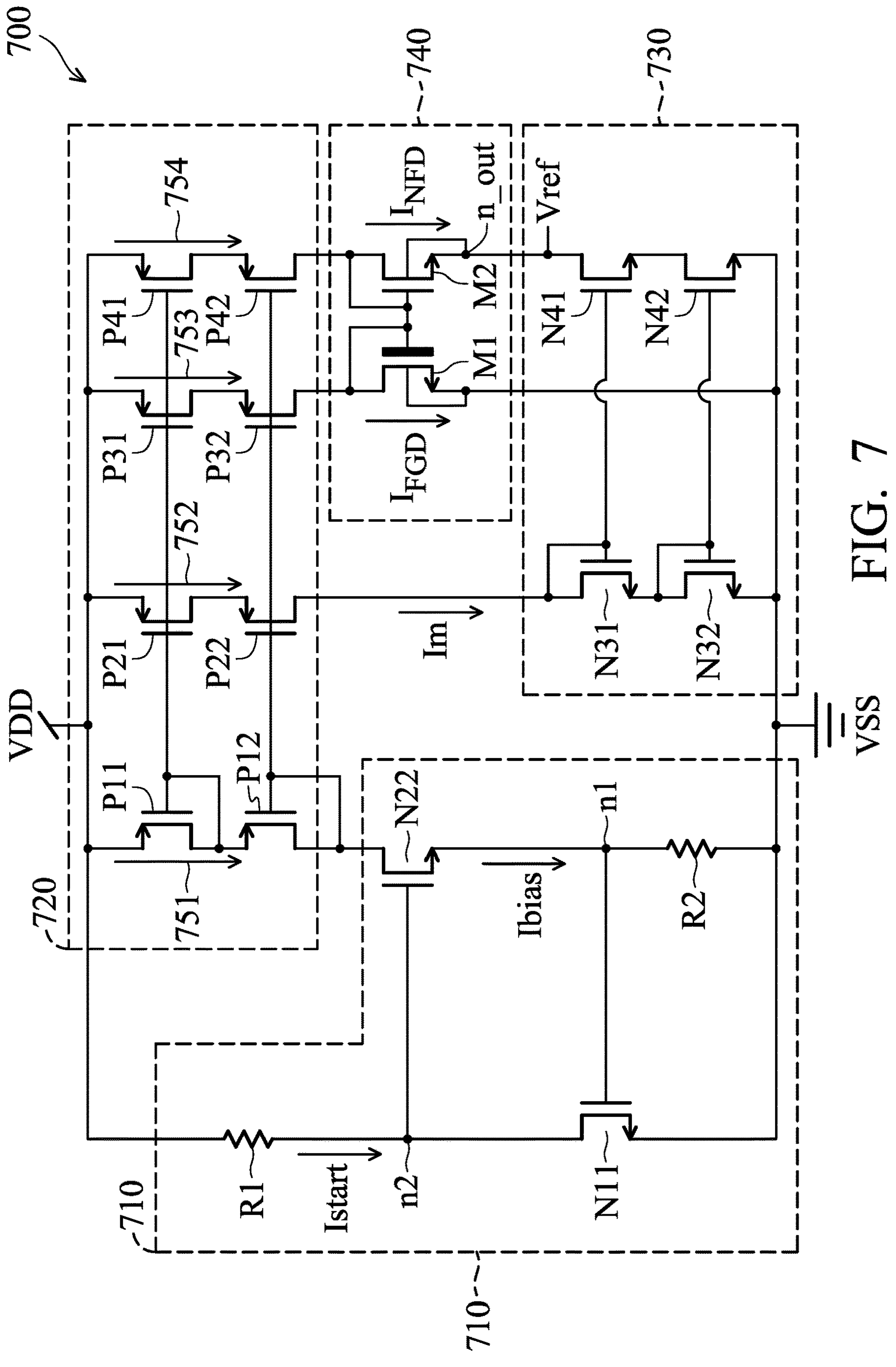
FIG. 7 shows a schematic diagram of a voltage reference circuit, in accordance with some embodiments of the disclosure.

FIG. 7 shows a schematic diagram of a voltage reference circuit 700, in accordance with some embodiments of the disclosure. The voltage reference circuit includes a flipped-gate transistor M1 and a transistor M2. The voltage reference circuit 700 further includes a startup and bias unit 710 configured to generate a bias current Ibias. A first current mirror unit 720 is configured to generate the current $I_{FGD}$ for the flipped-gate transistor M1 based on the bias current Ibias from the startup and bias unit 710. A second current mirror unit 730 is configured to receive a mirrored portion of the current $I_{FGD}$ and generate the current $I_{NFD}$ for the transistor M2. According to the current $I_{FGD}$ and the current $I_{NFD}$, the voltage reference circuit 700 is capable of providing a reference voltage in an output node n_out.

In the voltage reference circuit 700, the size of the flipped-gate transistor M1 is less than that of the transistor M2. In some embodiments, the flipped-gate transistor M1 is formed by a single transistor, and the transistor M2 is formed by multiple transistors. In some embodiments, the flipped-gate transistor M1 is arranged in the middle of the transistors of the transistor M2 in layout for match.

The startup and bias unit 710 is configured to receive a power (or an operating voltage) VDD. The startup and bias unit 710 is coupled between the power VDD and a ground VSS (or a negative supply voltage). The startup and bias unit 710 is configured to provide the bias current Ibias to the first current mirror unit 720 along a first current path 751. The bias current Ibias is self-biased current. The first current mirror unit 720 is configured to receive the power VDD. The first current mirror unit 720 is coupled in series to the second current mirror unit 730 along a second current path 752. The first current mirror unit 720 is coupled in series to the flipped-gate transistor M1 through a third current path 753. The first current mirror unit 720 is coupled in series to the drain of the transistor M2 along a fourth current path 754. In some embodiments, the power VDD is greater than twice the reference voltage Vref. In some embodiments, the ground VSS is equal to 0 V. In some embodiments, the ground VSS may be the negative supply voltage that is greater or less than 0 V such that power VDD is always referenced to the negative supply voltage.

The startup and bias unit 710 is configured to generate the bias current Ibias for the voltage reference circuit 700. The startup and bias unit 710 includes a startup resistor R1 configured to receive power VDD. A first bias transistor N11 is coupled in series with the startup resistor R1. A bias resistor R2 is coupled in series to a second bias transistor N22. The bias resistor R2 is coupled between the second bias transistor N22 and the ground VSS. A gate of the first bias transistor N11 is coupled to a node n1 between the second bias transistor N22 and the bias resistor R2. A gate of the second bias transistor N22 is coupled to a node n2 between the startup resistor R1 and the first bias transistor N11. A source of the first bias transistor N11 is coupled to the ground VSS. A drain of second bias transistor N22 is coupled in series with the first current mirror unit 720. In some embodiments, the first bias transistor N11 and the second bias transistor N22 are NMOS transistors. In some embodiments, the first bias transistor N11 and the second bias transistor N22 are in a weak inversion state. A weak inversion state means a gate-source voltage Vgs of a transistor is below a threshold voltage of the transistor. In some embodiments, the bulk and source of the first bias transistor N11 are coupled to the ground VSS together, and the bulk and source of the second bias transistor N22 are coupled to the bias resistor R2 together. In some embodiments, the startup resistor R1 and the bias resistor R2 are non-silicide poly resistors for high density and low temperature sensitivity.

In the startup and bias unit 710, the startup resistor R1 is used to provide a direct path from the power VDD to the gate of the second bias transistor N22 in order to begin operation of voltage reference circuit 700. A voltage across the bias resistor R2 is at least partially defined based on a gate-source voltage Vgs of the first bias transistor N11. The gate-source voltage Vgs of the first bias transistor N11 is defined at least in part by a voltage utilized to conduct a startup current Istart across the startup resistor R1. The startup current Istart of voltage reference circuit 700 is provided by the equation (VDD−V(n2))/r1, where VDD is the power voltage, r1 is a corresponding resistance of the startup resistor R1, and V(n2) is given by a sum of a gate-source voltage Vgs of the first bias transistor N11 and a gate-source voltage Vgs of the second bias transistor N22. The bias current Ibias is conducted across the second bias transistor N22 along the first current path 751 to the startup and bias unit 710. The bias current Ibias is given by the equation V(n1)/r2, where V(n1) is the gate-source voltage Vgs of the first bias transistor N11 and r2 is a corresponding resistance of the bias resistor R2.

The first current mirror unit 720 is used to provide an integer-ratio multiple of the bias current Ibias to the flipped-gate transistor M1. The first current mirror unit 720 includes a mirror transistor P11 coupled in series with a mirror transistor P12. The mirror transistor P11 is coupled to the power VDD. The mirror transistor P11 is diode-connected, and the mirror transistor P12 is diode-connected. A drain of the mirror transistor P12 is coupled to the second bias transistor N22 along the first current path 751. In some embodiments, the mirror transistors P11 and P12 are P-type transistors. In some embodiments, the bulk and source of the mirror transistor P11 are coupled to the power VDD, and the bulk and source of the mirror transistor P12 are coupled to the drain of the mirror transistor P11.

A mirror transistor P21 is coupled in series with a mirror transistor P22 along the second current path 752. The mirror transistor P21 is coupled to the power VDD. A gate of the mirror transistor P21 is coupled to a gate of the mirror transistor P11, and a gate of the mirror transistor P22 is coupled to a gate of the mirror transistor P12. A drain of the mirror transistor P22 is coupled to the second current mirror unit 730 along the second current path 752. In some embodiments, the mirror transistors P21 and P22 are P-type transistors. In some embodiments, the bulk and source of the mirror transistor P21 are coupled to the power VDD, and the bulk and source of the mirror transistor P22 are coupled to the drain of the mirror transistor P21.

A mirror transistor P31 is coupled in series with a mirror transistor P32 along the third current path 753. The mirror transistor P31 is coupled to the power VDD. A gate of the mirror transistor P31 is coupled to the gate of mirror transistor P11, and a gate of the mirror transistor P32 is coupled to the gate of mirror transistor P12. A drain of the mirror transistor P32 is coupled to the flipped-gate transistor M1 along the third current path 753. In some embodiments, the mirror transistors P31 and P32 are P-type transistors. In some embodiments, the bulk and source of the mirror transistor P31 are coupled to the power VDD, and the bulk and source of the mirror transistor P32 are coupled to the drain of the mirror transistor P31.

A mirror transistor P41 is coupled in series with a mirror transistor P42 along the fourth current path 754. The mirror transistor P41 is coupled to the power VDD. A gate of the mirror transistor P41 is coupled to the gate of the mirror transistor P11, and a gate of the mirror transistor P42 is coupled to the gate of the mirror transistor P12. A drain of the mirror transistor P42 is coupled to the voltage boxing unit 740 along the fourth current path 754. In some embodiments, the mirror transistors P41 and P42 are P-type transistors. In some embodiments, the bulk and source of the mirror transistor P41 are coupled to the power VDD, and the bulk and source of the mirror transistor P42 are coupled to the drain of the mirror transistor P41.

The first current mirror unit 720 is configured to receive the bias current Ibias from the startup and bias unit 710 along the first current path 751 and mirror the bias current Ibias along the second current path 752, the third current path 753 and the fourth current path 754. A size of the mirror transistor P11 is defined as an integer multiple of a first transistor unit size of the mirror transistors P21, P31 and P41. The mirror transistors P21, P31 and P41 independently have a size which is an integer multiple of the first transistor unit size. Furthermore, a size of the mirror transistor P12 is defined as an integer multiple of a second transistor unit size of the mirror transistors P22, P32 and P42. The mirror transistors P22, P32 and P42 independently have a size which is an integer multiple of the second transistor unit size. In some embodiments, the first transistor unit size is equal to the second transistor unit size.

Using the first transistor unit size, the current that is mirrored across each of the mirror transistors P11, P21, P31 and P41 of the first current mirror unit 720 is the ratio of the integer multiples of the relative sizes of the transistors multiplied by the current (i.e., the bias current Ibias) across the mirror transistor P11. The mirroring current Im across the mirror transistor P21 is given by (n_P21/n_P11)×Ibias, where n_P21 is an integer multiple of the first transistor unit size of the mirror transistor P21, n_P11 is an integer multiple of the first transistor unit size of the mirror transistor P11, and Ibias is the current across the mirror transistor P11. A current across the mirror transistor P31 is given by (n_P31/n_P11)×Ibias, where n_P31 is an integer multiple of the first transistor unit size of the mirror transistor P31. The current across the mirror transistor P41 is given by (n_P41/n_P11)×Ibias, wherein n_P41 is an integer multiple of the first transistor unit size of the mirror transistor P41.

Similarly, using the second transistor unit size, the current mirrored across each of the mirror transistors P12, P22, P32 and P42 of the first current mirror unit 720 is the ratio of the integer multiples of the relative sizes of the transistors multiplied by the current (i.e., the bias current Ibias) across the mirror transistor P12. The mirroring current Im across the mirror transistor P22 is given by (n_P22/n_P12)×Ibias, where n_P22 is an integer multiple of the second transistor unit size of the mirror transistor P22, n_P12 is an integer multiple of the second transistor unit size of the mirror transistor P12, and Ibias is the current across the mirror transistor P12. The current across the mirror transistor P32 is given by (n_P32/n_P12)×Ibias, where n_P32 is an integer multiple of the second transistor unit size of the mirror transistor P32. The current across the mirror transistor P42 is given by (n_P42/n_P12)×Ibias, wherein n_P42 is an integer multiple of the second transistor unit size of the mirror transistor P42. In some embodiments, the mirror transistors P12, P22, P32 and P42 can be omitted in the first current mirror unit 720. In some embodiments, the first transistor unit size is equal to the second transistor unit size.

The second current mirror unit 730 is configured to mirror the mirroring current Im from the first current mirror unit 720. The second current mirror unit 730 includes a mirror transistor N31 coupled in series with a mirror transistor N32. The mirror transistor N32 is coupled to the ground VSS. The mirror transistors N31 and N32 are diode-connected. A drain of the mirror transistor N31 is coupled to the mirror transistor P22 of the first current mirror unit 720 along the second current path 752. The second current mirror unit 730 further includes a mirror transistor N41 coupled in series with a mirror transistor N42. The mirror transistor N42 is coupled to the ground VSS. A gate of the mirror transistor N42 is coupled to a gate of the mirror transistor N32, and a gate of the mirror transistor N41 is coupled to a gate of the mirror transistor N31. A drain of the mirror transistor N41 is coupled to the transistor M2 along the fourth current path 754. In some embodiments, the mirror transistors N31, N32, N41 and N42 are NMOS transistors.

The second current mirror unit 730 is configured to receive the mirroring current Im from the first current mirror unit 720 along the second current path 752 and mirror the mirroring current Im along the fourth current path 754. A size of the mirror transistor N31 is defined as an integer multiple of a third transistor unit size. The mirror transistor N41 has a size which is an integer multiple of the third transistor unit size. In some embodiments, the first transistor unit size is equal to the third transistor unit size. In some embodiments, the first transistor unit size is different from the third transistor unit size. Moreover, a size of the mirror transistor N32 is defined as an integer multiple of a fourth transistor unit size. The mirror transistor N42 has a size which is an integer multiple of the fourth transistor unit size. In some embodiments, the third transistor unit size is equal to the fourth transistor unit size.

Using the third transistor unit size, the current mirrored across each of the mirror transistors of the second current mirror unit 730 is the ratio of the integer multiples of the relative sizes of the transistors multiplied by the current Im across the mirror transistor N31. The current across the mirror transistor N41 is given by (n_N41/n_N31)×Im, where n_N41 is an integer multiple of the third transistor unit size of the mirror transistor N41, n_N31 is an integer multiple of the third transistor unit size of the mirror transistor N31, and Im is the current across the mirror transistor N31.

Adjusting the size of the mirror transistors N31 and M41 (or N32 and N42) enables the current $I_{NFD}$ across the transistor M2 to be fine-tuned. According to the current ratio Iratio, the current $I_{NFD}$ may be determined in order to increase the accuracy and temperature independence of the reference voltage Vref output by the voltage reference circuit 700.

In some embodiments, the bulk and the source of the flipped-gate transistor M1 are coupled to the ground VSS together, and the bulk and the source of the transistor M2 are coupled to the second current mirror unit 730 together. Furthermore, the flipped-gate transistor M1 is diode-connected, and the transistor M2 is diode-connected. Thus, the flipped-gate transistor M1 and the transistor M2 form a diode pair. The reference voltage Vref is the Vgs subtraction of the diode pair.

In the voltage reference circuit 700, the combination ratio CR is equal to the device size ratio N of the transistor M2 to the flipped-gate transistor M1 times the current ratio Iratio of the current $I_{FGD}$ to the current $I_{NFD}$, i.e., $CR=N*Iratio=N*I_{FGD}/I_{NFD}$. As described above, when the combination ratio CR is equal to R (i.e., R=N*Iratio), the reference voltage Vref has a temperature coefficient of zero. Therefore, according to the combination ratio CR of R, the voltage reference circuit 700 is capable of providing a reference voltage Vref that is temperature insensitive.

Figure 8:
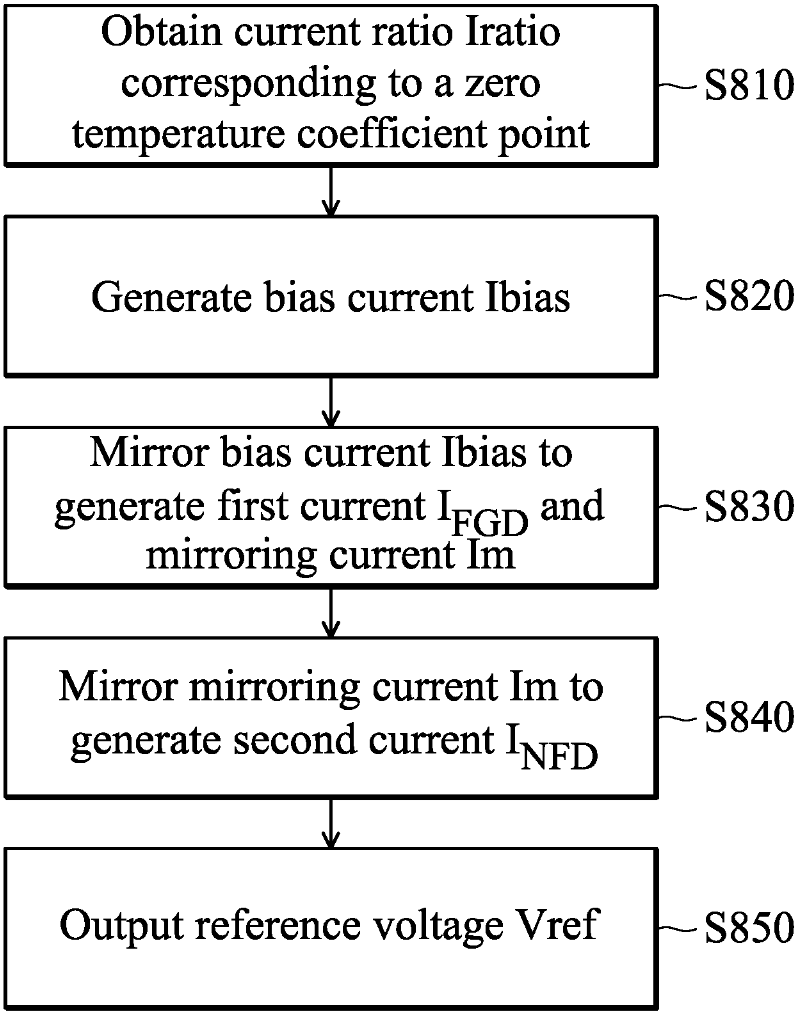
FIG. 8 shows a flowchart of a method for providing a reference voltage, in accordance with one or more embodiments.

FIG. 8 shows a flowchart of a method for providing a reference voltage, in accordance with one or more embodiments. The method of FIG. 8 begins with an operation S810 in which a current ratio Iratio corresponding to a zero temperature coefficient point is obtained according to the method of FIG. 2. As shown in FIG. 2, the flipped-gate transistor M1 and the transistor M2 of the voltage reference circuit 100 of FIG. 1 are set to similar sizes. The current ratio Iratio of the current $I_{FGD}$ flowing through the flipped-gate transistor M1 to the current $I_{NFD}$ flowing through the transistor M2 (i.e., Iratio=$I_{FGD}/I_{NFD}$) in the voltage reference circuit 100, is swept over various temperatures, so as to obtain the zero temperature coefficient point where the current ratio Iratio is equal to R according to the reference voltages Vref corresponding to various temperatures. When the current ratio Iratio is equal to R, the reference voltages Vref at different temperature have the same voltage values. In other words, the reference voltage Vref corresponding to the current ratio Iratio of R is a temperature insensitive voltage.

In operation S820, a bias current Ibias is generated. In some embodiments, the bias current Ibias is generated by using a startup and bias current generator, e.g., the startup and bias unit 710 of FIG. 7. The bias current Ibias provides a basis for scaling of other currents throughout the voltage reference circuit, e.g., the voltage reference circuit 700. In some embodiments, the startup current Istart is generated based on an operating voltage, e.g., the power VDD, of the voltage reference circuit. In some embodiments, the bias current Ibias is generated based on a gate source voltage of a bias transistor, e.g., first bias transistor N11, divided by a resistance across a bias resistor, e.g., the bias resistor R2 of FIG. 7.

Method of FIG. 8 continues with operation S830 in which the bias current Ibias is mirrored to generate the current $I_{FGD}$ across a flipped-gate transistor and a mirroring current Im. The current $I_{FGD}$ across the flipped gate transistor, e.g., the flipped gate transistor M1 of FIG. 7, is determined based on a transistor unit size, e.g., the first transistor unit size. In some embodiments, the bias current Ibias is mirrored using a first current mirror, e.g., the first current mirror unit 720 of FIG. 7. In some embodiments, the ratio of the current $I_{FGD}$ to the bias current Ibias is set by adjusting the size of the mirroring transistors within the first current mirror. The mirroring current Im is generated along a different current path from the first current mirror. In some embodiments, the mirroring current Im is equal to the current $I_{FGD}$. In some embodiments, the mirroring current Im is different from the current $I_{FGD}$.

In operation S840, the mirroring current Im is mirrored to generate the current $I_{NFD}$ across a non-flipped-gate transistor. The current $I_{NFD}$ is based on the ratio of integer multiples of the transistor unit size, e.g., the third transistor unit size, across the non-flipped-gate transistor, e.g., the transistor M2 of FIG. 7. As described above, the current ratio Iratio of the current $I_{FGD}$ to the current $I_{NFD}$ is equal to R, i.e., Iratio=R.

In operation S850, a reference voltage Vref is output. The reference voltage Vref, e.g., the reference voltage Vref of FIG. 7, is temperature independent. The reference voltage Vref is usable by external circuitry for performing comparisons. In some embodiments, the reference voltage Vref is less than half of the power VDD of the voltage reference circuit.

One of ordinary skill in the art would recognize that additional operations are able to be included in method of FIG. 8, that operations are able to be omitted, and an order of operations are able to be re-arranged without departing from the scope of this description.

Embodiments of voltage reference circuit and method for providing reference voltage are provided. By sweeping the current ratio Iratio of a pair of the flipped-gate transistor and the non-flipped-gate transistor, a single ZTC point in the current-voltage (IV) curves over various temperatures is obtained. If no single ZTC point is present, the flipped-gate transistor is not suitable for voltage reference design. The single ZTC point corresponds to the optimized current ratio Iratio of the current $I_{FGD}$ to the current $I_{NFD}$. The current $I_{FGD}$ is the current flowing through the flipped-gate transistor, and the current $I_{NFD}$ is the current flowing through the non-flipped-gate transistor. In the voltage reference circuit (e.g., 700 of FIG. 7), the flipped-gate transistor and the non-flipped-gate transistor are diode-connected, and two current mirror units (e.g., 720 and 730 of FIG. 7) are used to generate the current $I_{NFD}$ and the current $I_{FGD}$ according to the combination ratio CR of R. Thus, a temperature insensitive reference voltage Vref may be obtained without considering the threshold voltage and device properties of the flipped-gate transistor and the non-flipped-gate transistor. Compared with a traditional bandgap reference circuit, the voltage reference circuit has lower power and linearity over temperature because no BJT is used.

In some embodiments, a voltage reference circuit is provided. The voltage reference circuit includes a first transistor, a flipped-gate transistor, a first current mirror unit, a second current mirror unit, and an output note. The first transistor is formed by a plurality of second transistors. A gate and a drain of the flipped-gate transistor are coupled to a gate and a drain of each of the second transistors. The first current mirror unit is configured to provide a first current to the flipped-gate transistor and a mirroring current in response to a bias current. The second current mirror unit is configured to drain a second current from the first transistor in response to the mirroring current. The output node is coupled to a source of each of the second transistors and the second current mirror unit, and configured to output a reference voltage. Size of the flipped-gate transistor is less than that of the first transistor.

In some embodiments, a voltage reference circuit is provided. The voltage reference circuit includes a first diode-connected transistor, a second diode-connected transistor and an output node. The first diode-connected transistor is arranged in a first current path. The second diode-connected transistor is arranged in a second current path, and gates and drains of the first and second diode-connected transistors are coupled together. The output node is coupled to a source and a bulk of the second diode-connected transistor, and is configured to output a reference voltage. Size of the first diode-connected transistor is less than that of the second diode-connected transistor. The first diode-connected transistor is a single flipped-gate transistor, and the second diode-connected transistor is formed by a plurality of non-flipped-gate transistors.

In some embodiments, a method for providing a reference voltage is provided. A current ratio of a first current of a first flipped-gate transistor to a second current of a first non-flipped-gate transistor in a first circuit is adjusted with a plurality of temperatures, to obtain a first current ratio having the same voltage values at the temperatures. The first flipped-gate transistor and the first non-flipped-gate transistor are the same size. A bias current is mirrored to generate a third current across a second flipped-gate transistor and to generate a mirroring current in a second circuit. The mirroring current is mirrored to generate a fourth current across a plurality of second non-flipped-gate transistors in the second circuit. The reference voltage is outputting in response to the fourth current. A current ratio of the third current to the fourth current is equal to the first current ratio.

The foregoing outlines nodes of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A voltage reference circuit, comprising:
- a first transistor formed by a plurality of second transistors;
- a flipped-gate transistor, wherein a gate and a drain of the flipped-gate transistor are coupled to a gate and a drain of each of the second transistors;
- a first current mirror unit configured to provide a first current to the flipped-gate transistor and a mirroring current in response to a bias current;
- a second current mirror unit configured to drain a second current from the first transistor in response to the mirroring current; and
- an output node coupled to a source of each of the second transistors and the second current mirror unit, and configured to output a reference voltage,
- wherein size of the flipped-gate transistor is less than that of the first transistor.

2. The voltage reference circuit as claimed in claim 1, wherein the flipped-gate transistor is arranged in the middle of the second transistors in layout.

3. The voltage reference circuit as claimed in claim 1, further comprising:
- a startup and biasing unit, comprising:
- a first resistor coupled to a power supply;
- a first N-type transistor coupled between the first resistor and a ground;
- a second resistor coupled between a gate of the first N-type transistor and the ground; and
- a second N-type transistor coupled between the second resistor and the first current mirror unit, having a gate coupled to the first resistor,
- wherein the bias current is a current flowing through the second resistor and the second N-type transistor.

4. The voltage reference circuit claimed in claim 1, wherein the first current mirror unit comprises:
- a first P-type transistor coupled to the power supply, wherein a gate and a drain of the first P-type transistor are coupled to a startup and biasing unit;
- a second P-type transistor coupled between the power supply and the second current mirror unit, having a gate coupled to the gate and the drain of the first P-type transistor;
- a third P-type transistor coupled between the power and the drain of the flipped-gate transistor, having a gate coupled to the gate of the first P-type transistor; and
- a fourth P-type transistor coupled between the power and the drain of each of the second transistors, having a gate coupled to the gate of the first P-type transistor,
- wherein the bias current is a current flowing through the first P-type transistor, and the mirroring current is a current flowing through the second P-type transistor.

5. The voltage reference circuit as claimed in claim 1, wherein the second current mirror unit comprises:
- a third N-type transistor coupled between a ground and the first current mirror unit; and
- a fourth N-type transistor coupled between the ground and the output node, having a gate coupled to a gate and a drain of the third N-type transistor,
- wherein the mirroring current is a current flowing through the third N-type transistor.

6. The voltage reference circuit as claimed in claim 1, wherein a bulk of the first transistor is coupled to the output node.

7. The voltage reference circuit as claimed in claim 1, wherein a current ratio of the first current and the second current is equal to a first value such that the reference voltage has a temperature coefficient of zero.

8. A voltage reference circuit, comprising:
- a first diode-connected transistor arranged in a first current path;
- a second diode-connected transistor arranged in a second current path, wherein gates and drains of the first and second diode-connected transistors are coupled together; and
- an output node coupled to a source and a bulk of the second diode-connected transistor, and configured to output a reference voltage,
- wherein size of the first diode-connected transistor is less than that of the second diode-connected transistor,
- wherein the first diode-connected transistor is a single flipped-gate transistor, and the second diode-connected transistor is formed by a plurality of non-flipped-gate transistors.

9. The voltage reference circuit as claimed in claim 8, further comprising:
- a first current unit configured to provide a first current in the first current path; and
- a second current unit configured to provide a second current in the second current path.

10. The voltage reference circuit as claimed in claim 9, wherein a current ratio of the first current and the second current is equal to a first value such that the reference voltage has a zero temperature coefficient.

11. The voltage reference circuit as claimed in claim 8, wherein the second current path is independent of the first current path.

12. The voltage reference circuit as claimed in claim 8, further comprising:
- a first current mirror unit configured to provide a first current to the first current path and a mirroring current in response to a bias current; and
- a second current mirror unit configured to provide a second current to the second current path in response to the mirroring current.

13. The voltage reference circuit as claimed in claim 12, further comprising:
- a startup and biasing unit, comprising:
- a first resistor coupled to a power supply;
- a first N-type transistor coupled between the first resistor and a ground;
- a second resistor coupled between a gate of the first N-type transistor and the ground; and
- a second N-type transistor coupled between the second resistor and the first current mirror unit, having a gate coupled to the first resistor, wherein the bias current is a current flowing through the second resistor and the second N-type transistor.

14. The voltage reference circuit claimed in claim 12, wherein the first current mirror unit comprises:

a first P-type transistor coupled to a power supply, wherein a gate and a drain of the first P-type transistor are coupled to a startup and biasing unit;

a second P-type transistor coupled between the power supply and the second current mirror unit, having a gate coupled to the gate and drain of the first P-type transistor;

a third P-type transistor coupled between the power supply and a drain of the first diode-connected transistor, having a gate coupled to the gate of the first P-type transistor; and a fourth P-type transistor coupled between the power supply and a drain of the second diode-connected transistor, having a gate coupled to the gate of the first P-type transistor, wherein the bias current is a current flowing through the first P-type transistor, and the mirroring current is a current flowing through the second P-type transistor.

15. The voltage reference circuit as claimed in claim 12, wherein the second current mirror unit comprises:

a third N-type transistor coupled between a ground and the first current mirror unit; and a fourth N-type transistor coupled between the ground and the output node, having a gate coupled to a gate and a drain of the third N-type transistor, wherein the mirroring current is a current flowing through the third N-type transistor.

16. A method for providing a reference voltage, comprising:

adjusting a current ratio of a first current of a first flipped-gate transistor to a second current of a first non-flipped-gate transistor in a first circuit with a plurality of temperatures, to obtain a first current ratio having the same voltage values at the temperatures, wherein the first flipped-gate transistor and the first non-flipped-gate transistor are the same size;

mirroring a bias current to generate a third current across a second flipped-gate transistor and to generate a mirroring current in a second circuit;

mirroring the mirroring current to generate a fourth current across a plurality of second non-flipped-gate transistors in the second circuit; and outputting the reference voltage in response to the fourth current, wherein a current ratio of the third current to the fourth current is equal to the first current ratio.

17. The method as claimed in claim 16, wherein the first circuit comprises:

a first current source configured to provide the first current to the first flipped-gate transistor;

the first flipped-gate transistor having a drain and a gate coupled to the first current source;

the first non-flipped-gate transistor having a gate coupled to the gate of the first flipped-gate transistor; and a second current source configured to drain the second current from the first flipped-gate transistor.

18. The method as claimed in claim 16, wherein the second circuit comprises:

a startup and bias unit configured to generate the bias current.

19. The method as claimed in claim 16, wherein the second circuit comprises:

a first current mirror unit configured to provide the third current to the second flipped-gate transistor and the mirroring current in response to the bias current; and a second current mirror unit configured to drain the fourth current from the second non-flipped-gate transistors in response to the mirroring current, wherein the second flipped-gate transistor and the second non-flipped-gate transistors are diode-connected, and gates of the second flipped-gate transistor and the second non-flipped-gate transistors are coupled together.

20. The method as claimed in claim 16, wherein the second flipped-gate transistor and the second non-flipped-gate transistors are arranged in independent current paths of the second circuit.

* * * * *